Sept. 8, 1970          G. COHEN-SEAT          3,528,074
APPARATUS FOR INDICATING THE REACTION OF A SUBJECT
Filed March 11, 1968          2 Sheets-Sheet 1
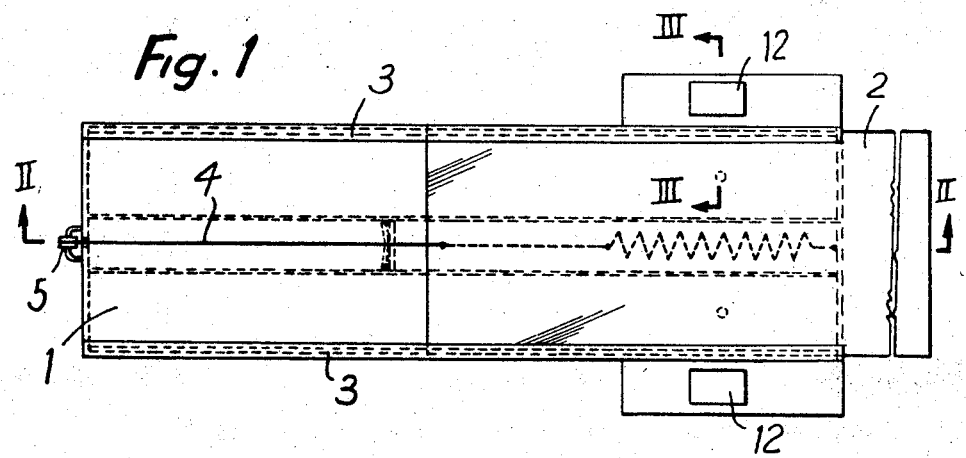
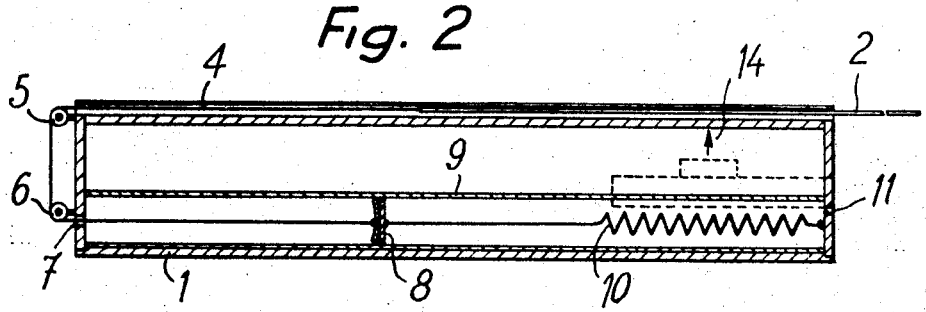
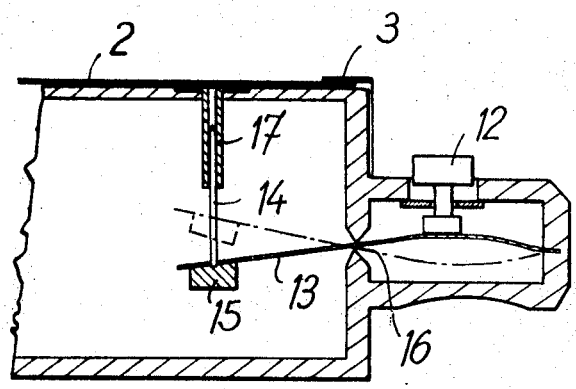
INVENTOR
Gilbert Cohen-Seat
BY Desto and Montgomery
ATTORNEYS

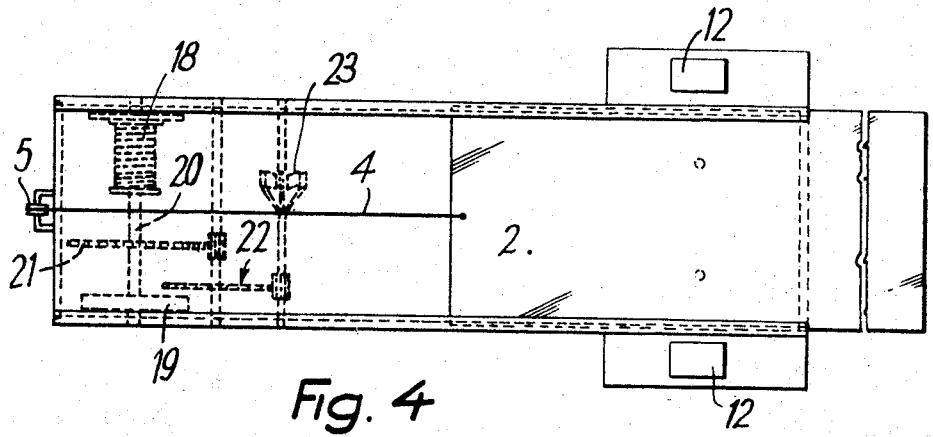
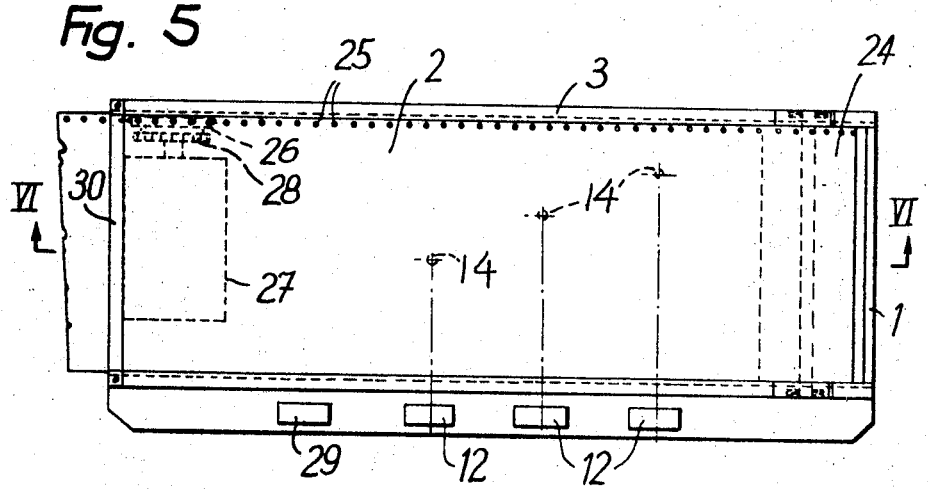
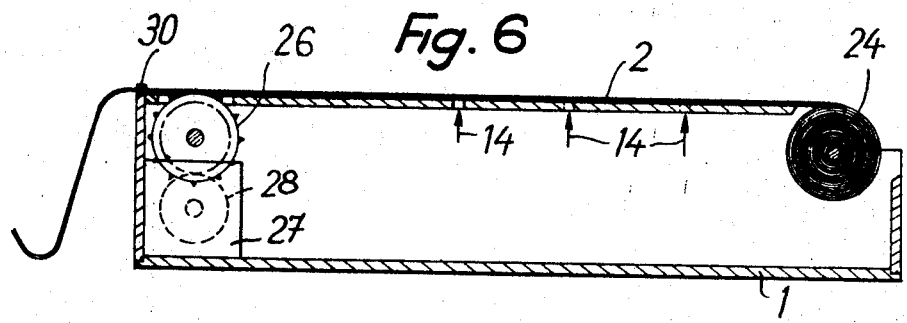

United States Patent Office 3,528,074
Patented Sept. 8, 1970

3,528,074
APPARATUS FOR INDICATING THE REACTION OF A SUBJECT
Gilbert Cohen-Seat, 15 Avenue d'Orsay, Paris, France
Filed Mar. 11, 1968, Ser. No. 712,194
Int. Cl. G07c 1/08; G01d 15/04
U.S. Cl. 346—104                                        7 Claims

ABSTRACT OF THE DISCLOSURE

Apparatus for indicating the attention or reaction of a subject listening to audiovisual programs, having a housing over which a sheet of indicating material is driven. A manually operable pointed member is mounted in the housing so that it can perforate the sheet at any given moment.

---

This invention relates to devices enabling the watching of the presence, attention or reaction of a subject listening to an audiovisual programme to be indicated or tested. In order to signal his active presence, the subject must make a suitable mark on a paper each time his instructions require him to do so (word, image, predetermined phenomenon, prescribed observation, etc.) in connection with the broadcast or film.

According to the invention, an apparatus for indicating and controlling attention to and/or application of visual or audiovisual information is characterised in that it comprises a housing carrying a driving device for driving a sheet of recording material which slides on the casing between two lateral guides, and at least one pointed member which is manually controlled and enables the sheet to be perforated at a desired moment.

In order that the invention may be more fully understood, various embodiments in accordance therewith will now be described, by way of example, with reference to the accompanying drawings in which:

FIG. 1 is a plan view of an apparatus of the invention;
FIG. 2 is a section along the line II—II of FIG. 1;
FIG. 3 is a section along the line III—III of FIG. 1;
FIG. 4 is a plan view of another embodiment of the apparatus of the invention;
FIG. 5 is a plan view of a third embodiment of the apparatus of the invention;
FIG. 6 is a section along the line VI—VI of FIG. 5.

The apparatus of the invention for controlling attention shown in FIGS. 1, 2 and 3 comprises a housing 1 over the top of which moves a sheet 2 guided between two lateral slideways 3. The sheet 2 is attached to one end of a string 4 which passes over two rollers 5 and 6 and enters the housing through an opening 7 to be attached at its other end to a piston 8 which moves in a tube 9 under the pull of a spring 10 to which the piston 8 is fixed.

Since the tube 9 is closed by the walls of the housing, a hole 11 is formed in the housing to enable air pushed by the movement of the piston to escape, and to enable the movement of the piston 8 pulled by the spring 10 to be slowed and regulated. The housing 1 is provided in addition at each side with a push button 12 which, by bearing on a blade spring 13, actuates a pointed member 14 which perforates the sheet 2. This precurved blade 13 is held at its centre in a slot 16 of the housing and one of its ends is fixed in the housing, while the other end is weighted by a weight 15 and carries the pointed member 14.

Thus, when the button 12 is pushed, the part of the blade 13 between its fixed end and the slot 16 takes on an inverse curve and the free end of the blade moves suddenly. The pointed member 14, sliding in a guide 17, perforates the sheet under the kicking action due partly to the weight 15, the length of the pointed member being such that its point is flush with the housing underneath the sheet when the button 12 remains pushed in and that the weighted end is in its equilibrium position.

In another embodiment of the apparatus of the invention, shown in FIG. 4, the sheet 2 is pulled by the string 4 which is wound around a drum 18, the rotation of which is effected by a spiral spring 19 secured to the spindle 20 on which the drum rotates.

A toothed wheel 21 mounted on the spindle 20 drives a bladed regulator 23 by means of a train of gears 22.

In a third embodiment of the apparatus of the invention, shown in FIGS. 5 and 6, the sheet 2 is wound off a magazine roller 24 contained within the housing. This sheet, which has lateral perforations 25, is driven between the slideways 3 by means of a toothed wheel 26, driven by an electric motor 27 through gears 28.

The apparatus also has three push buttons 12 operating three perforating pointed members 14, as well as a switch 29 for the electric motor 27.

The apparatus is completed by a guide strip 30 at the end of the housing 1 and under which passes the sheet 2, this strip 30 acting as a knife for tearing the sheet 2.

In this last embodiment of the apparatus of the invention, the unwinding of the sheet takes place in a regular manner and at a predetermined speed thus enabling tests of calibrated performances to be carried out, which were not possible with the other embodiments described above.

The invention is naturally not limited solely to the embodiments described and shown, but covers all variations thereof, the electric motor being replaceable by a mechanical motor.

What is claimed is:
1. An apparatus for indicating the attention or reaction of a subject listening to an audiovisual program so as to permit an observer to watch said reaction, comprising a housing, independent driving means carried by the housing, said driving means being adapted to drive a sheet of indicating material disposed on the housing, a pair of lateral guide means on the housing, between which means the indicating material slides when driven by the driving means, manually operable means including a blade spring having at least one pointed member and a counteracting member at one end thereof, said spring fixed at substantially its other end to the housing, pivotal rest means located at substantially the central region of said spring, and pushbutton means which act upon said spring between its fixed point and said pivotal rest means so that when manual pressure is applied to said pushbutton means said pointed member perforates and immobilizes the sheet at a desired moment.

2. The apparatus of claim 1 wherein said pivotal rest means comprises a slot in said housing and said independent driving means moves said sheet at a continuous, constant speed.

3. An apparatus according to claim 2, comprising a precurved portion of the blade spring between its fixed point and central region, said precurved portion being convex toward the pushbutton.

4. An apparatus according to claim 2, wherein said return member comprises a weighting element on the free end of the blade spring.

5. An apparatus according to claim 2, wherein said driving means comprises a spring secured with respect to the housing and forming said driving means, a piston and a tube within which the piston is movably disposed, said piston being connected to the spring, and a flexible sheet is moved by the force of the spring but controlled by element connecting the piston to the sheet, whereby the piston.

6. An apparatus according to claim 2, wherein the driving means comprises a spiral spring forming the driving means, a rotatable drum, a flexible element connected to an end of the sheet and bladed regulating means, the sheet being driven by the spring and controlled by the regulating means.

7. An apparatus according to claim 2, wherein the driving means comprises an electric motor, a toothed wheel adapted for driving engagement with perforations in a strip of indicating material, and a roller magazine carrying the indicating material, the toothed wheel being driven by the electric motor.

References Cited

UNITED STATES PATENTS

| | | | |
|---|---|---|---|
| 1,875,653 | 9/1932 | Post | 346—117 |
| 2,169,230 | 8/1939 | De Martile | 346—78 X |
| 3,214,847 | 11/1965 | Dorsett et al. | 35—9 |
| 3,299,534 | 1/1967 | Schlafly | 35—9 |

JOSEPH W. HARTARY, Primary Examiner

U.S. Cl. X.R.

346—134, 141; 83—588

PO-1050
(5/69)

UNITED STATES PATENT OFFICE
CERTIFICATE OF CORRECTION

Patent No. 3,528,074  Dated September 8, 1970

Inventor(s) Gilbert Cohen-Seat

It is certified that error appears in the above-identified patent and that said Letters Patent are hereby corrected as shown below:

Column 2, Claim 5, reverse lines 6 and 7 to read as follows: "element connecting the piston to the sheet, whereby the sheet is moved by the force of the spring but controlled by".

SIGNED AND
SEALED
NOV 17 1970

NOV. 17, 1970

(SEAL)
Attest:

Edward M. Fletcher, Jr.
Attesting Officer

WILLIAM E. SCHUYLER, JR.
Commissioner of Patents